US008790528B2

(12) United States Patent
Kwok

(10) Patent No.: US 8,790,528 B2
(45) Date of Patent: Jul. 29, 2014

(54) MANUFACTURE FILTRATION ELEMENTS

(76) Inventor: Kleo Kwok, Oro Valley, AZ (US)

( * ) Notice: Subject to any disclaimer, the term of this patent is extended or adjusted under 35 U.S.C. 154(b) by 102 days.

(21) Appl. No.: 13/450,288

(22) Filed: Apr. 18, 2012

(65) Prior Publication Data

US 2012/0199551 A1 Aug. 9, 2012

Related U.S. Application Data

(63) Continuation-in-part of application No. 12/024,697, filed on Feb. 1, 2008, now abandoned.

(60) Provisional application No. 60/888,895, filed on Feb. 8, 2007, provisional application No. 60/986,206, filed on Nov. 7, 2007.

(51) Int. Cl.
| | | |
|---|---|---|
| *B01D 29/00* | (2006.01) | |
| *A62B 23/02* | (2006.01) | |
| *B01D 46/40* | (2006.01) | |
| *B01D 29/01* | (2006.01) | |
| *B01D 46/00* | (2006.01) | |

(52) U.S. Cl.
CPC .............. *A62B 23/025* (2013.01); *B01D 46/40* (2013.01); *B01D 29/012* (2013.01); *B01D 46/0001* (2013.01)
USPC .................... 216/41; 216/52; 216/56; 216/83; 216/100; 216/101; 219/121.71

(58) Field of Classification Search
None
See application file for complete search history.

(56) References Cited

U.S. PATENT DOCUMENTS

| | | | |
|---|---|---|---|
| 3,359,192 A * | 12/1967 | Heinrich et al. .............. 216/100 |
| 3,441,145 A | 4/1969 | Pearson ........................ 210/445 |
| 3,648,843 A | 3/1972 | Pearson ........................ 210/443 |
| RE29,524 E | 1/1978 | Spencer ........................ 428/134 |
| 4,111,032 A * | 9/1978 | Rault ............................ 72/366.2 |
| 5,088,170 A * | 2/1992 | Spath ................................ 29/6.1 |
| 5,711,877 A | 1/1998 | Gonzalez ...................... 210/488 |
| 5,863,312 A | 1/1999 | Wolfe .............................. 55/495 |
| 6,414,835 B1 | 7/2002 | Wolf et al. ..................... 361/302 |
| 6,417,276 B2 | 7/2002 | Dubensky et al. ............. 525/191 |
| 6,581,640 B1 | 6/2003 | Barron .......................... 137/833 |
| 6,706,204 B2 | 3/2004 | Roitman et al. ................ 216/33 |
| 7,198,726 B2 | 4/2007 | Donaldson et al. ............. 216/27 |
| 7,201,846 B2 * | 4/2007 | Cho et al. ................. 210/321.84 |

(Continued)

OTHER PUBLICATIONS

European Office Action issued in related application No. 12 189 632.8, dated Sep. 9, 2013 (5 pgs).
Chinese Official Action (with translation) issued in appln. No. 2008800039729 dated Apr. 23, 2012 (9 pgs).
Chinese Official Action issued in appln. No. 200880003972.9 dated Nov. 23, 2011 (4 pgs).

(Continued)

*Primary Examiner* — Anita Alanko
(74) *Attorney, Agent, or Firm* — Hayes Soloway P.C.

(57) ABSTRACT

Selective etching techniques are used to manufacture a basic filtration element, which can then be used as a basis for constructing various devices for different applications. In this process, sheets of etchable material are etched from one or both sides of that sheet to form channels in a premasked pattern, which controls the minimum opening of the filtration element. The desired channel opening is only limited by the capability of the photochemical etching system being used. Alternatively, a filter element may be made by rolling or extruding a first sheet to form a plurality of recessed areas bordered by lands, selectively etching or punching through the recessed pattern areas, and bonding a second sheet having a plurality of etched or punched through areas to the first sheet, and, aligning the etched through areas to the second sheet with the recessed areas of the first sheet.

12 Claims, 13 Drawing Sheets

(56) References Cited

U.S. PATENT DOCUMENTS

| | | | |
|---|---|---|---|
| 7,399,423 B2 | 7/2008 | Yagi et al. | 216/56 |
| 7,442,303 B2 | 10/2008 | Jacobson | 210/510.1 |
| 2003/0089236 A1 | 5/2003 | Zhang et al. | 96/59 |
| 2004/0188072 A1* | 9/2004 | Gerard | 165/164 |
| 2004/0245191 A1 | 12/2004 | Yagi et al. | 210/791 |
| 2007/0157762 A1* | 7/2007 | Frechette et al. | 76/104.1 |

OTHER PUBLICATIONS

Extended EPO Supplementary Search Report issued in appln. No. PCT/US2008053079 dated Aug. 18, 2010, (8 pgs).

European Search Report issued in corresponding European Patent Application Ser No. 12189632.8, dated Dec. 19, 2012 (5 pgs).

Chinese Official Action (with translation) issued in Appln. No. 2008800039729 dated Nov. 19, 2012 (6 pgs).

\* cited by examiner

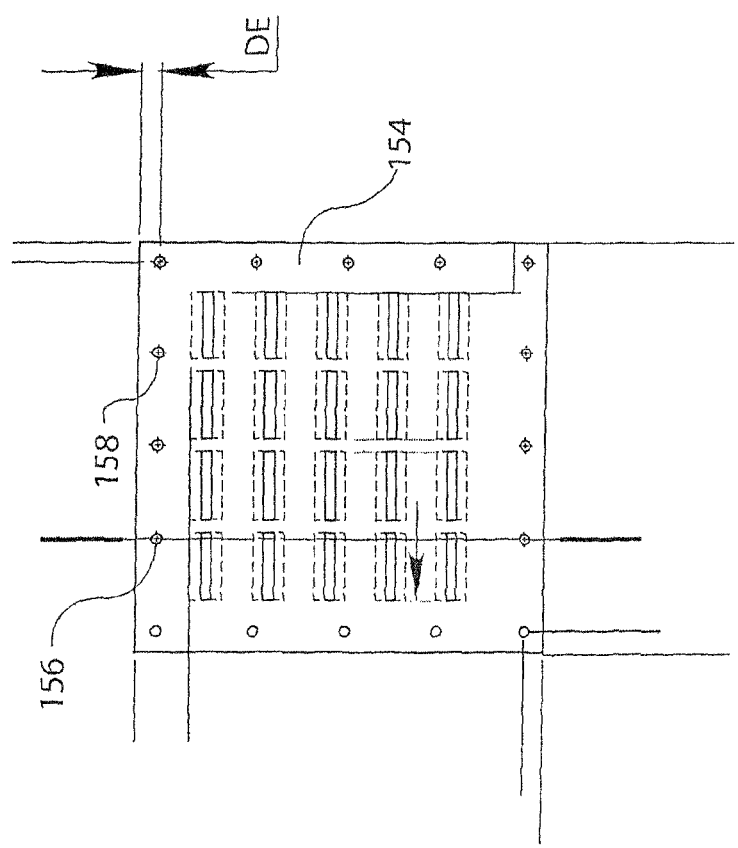
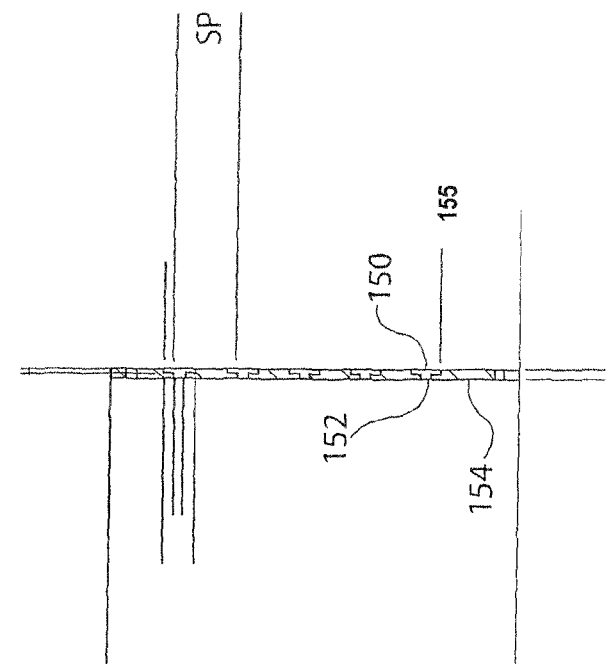

MANUFACTURE FILTRATION ELEMENTS

CROSS REFERENCE TO RELATED APPLICATION

This application is a continuation-in-part of my U.S. application Ser. No. 12/024,697, filed Feb. 1, 2008 now abandoned, which application in turn claims priority from U.S. Provisional Application Ser. No. 60/888,895 filed Feb. 8, 2007, and U.S. Provisional Application Ser. No. 60/986,206 filed Nov. 7, 2007.

BACKGROUND OF THE INVENTION

This invention relates to the manufacture of filters. The invention has particular utility with reference to the manufacture of reusable filter elements, and will be described in connection with such utility, although other utilities are contemplated.

BRIEF DESCRIPTION OF THE PRIOR ART

There are many methods in existence to manufacture filtration elements for various applications. Examples include etched disc, pleated materials, mesh screen, folded paper, etc. The present invention provides improvement over such prior art methods.

SUMMARY OF THE INVENTION

In my aforesaid parent application I disclose employing photochemical etching techniques to manufacture a basic filtration element, which can then be used as a basis for constructing various devices for different applications. In this process, sheets of etchable material are etched from one or both sides of that sheet to form channels in a premasked pattern, which controls the minimum opening of the filtration element. The desired channel opening is only limited by the capability of the photochemical etching system being used.

In my aforesaid parent application I also disclose a method for making a filter element by rolling or extruding a first sheet to form a plurality of recessed areas bordered by lands, selectively etching or punching or machining through the recessed pattern areas, and bonding a second sheet having a plurality of etched or punched or machined through areas to the first sheet, and, aligning the etched through areas to the second sheet with the recessed areas of the first sheet.

The present invention provides an improved method for forming a filter by forming channel openings through sheets of material by etching or machining, wherein the channels formed on one side have a different width than the channels formed on the other side. In a modification lands are formed on one or both sides of the sheets by an additive process, e.g. to add stability and strength to the sheets, or refining the formed channels.

BRIEF DESCRIPTION OF DRAWINGS

Other features and advantages of the present invention will be seen from the following detailed description, taken into conjunction with the accompanying drawings, wherein;

FIG. 15 is a top plan view and FIG. 16 is a side elevational view, in cross section, showing a filter element made in accordance with the present invention;

DETAILED DESCRIPTION OF PREFERRED EMBODIMENT

Figure 1:
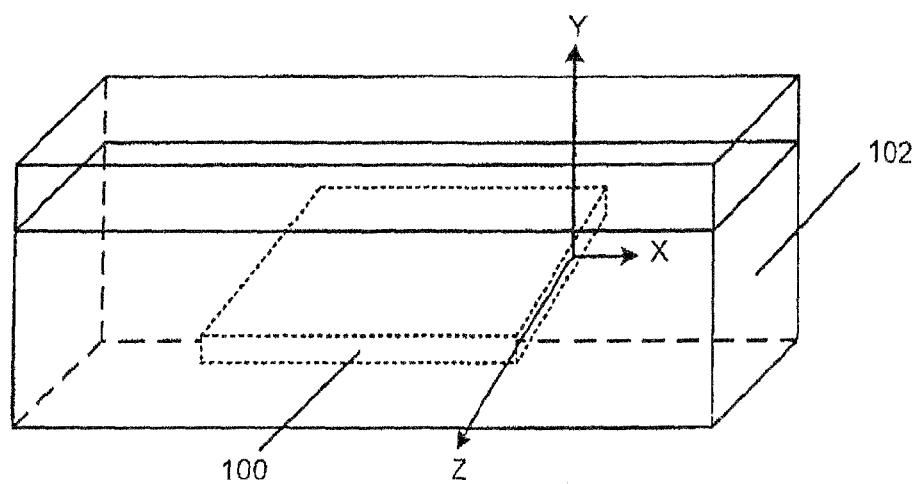
FIG. 1 grammatically illustrates an etching bath for forming a basic filtration element in accordance with my parent application.
Figure 2:
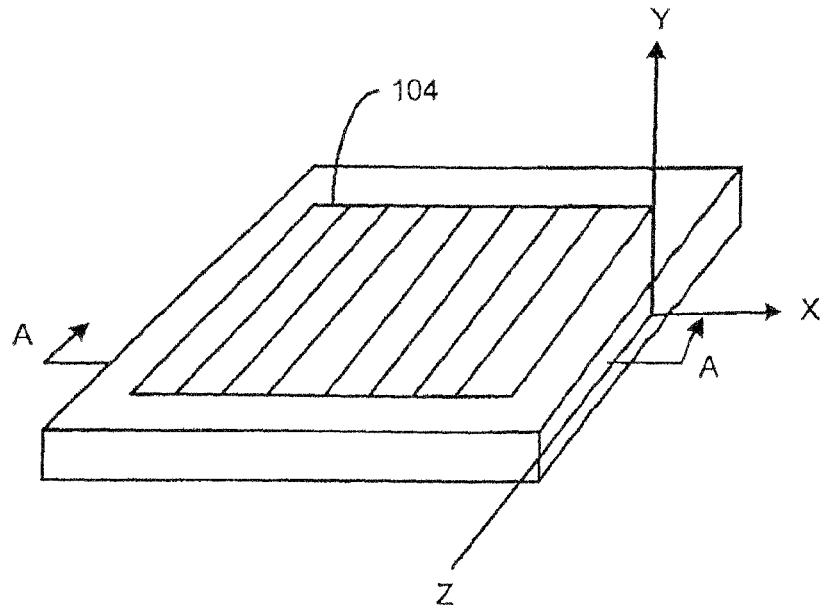
FIGS. 2 and 3 illustrate etching patterns for a filtration element made in accordance with my parent application.
Figure 3:
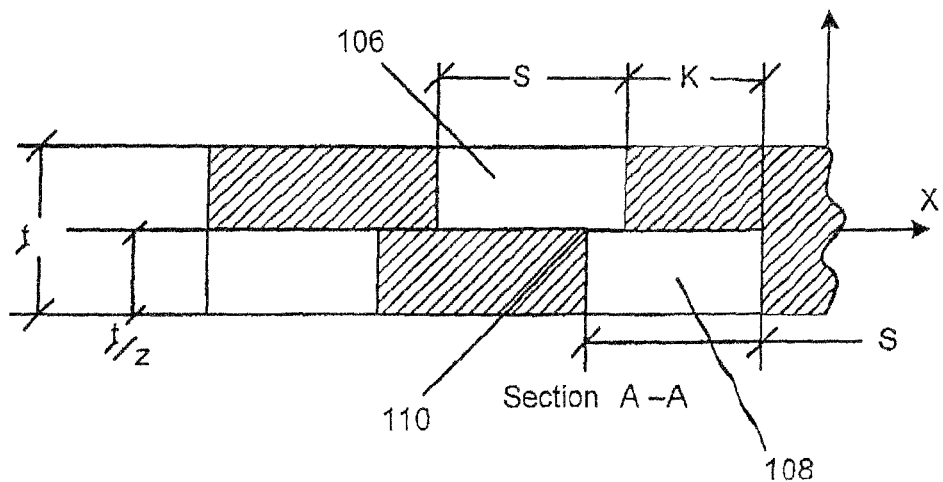

In the following detailed description, the discussion of (FIGS. 1-14) derives from my parent application, while FIGS. 15-18 depict new embodiments. Referring to FIG. 1, a metal sheet 100 is immersed in an etching bath 102, and relative movement is established between the sheet and the bath, e.g. by moving the sheet back and forth in the bath, for example, with X being the direction of the sheet movement in the etching bath and Y being the thickness direction, the sheet of material is masked 104 and etched in the Y direction as depicted in FIG. 2. Alternatively, the etch bath may be caused to flow over the sheet, or sprayed onto the sheet. The etch bath etches the sheet into etched patterned channels or openings 106, 108 (FIG. 3) to a depth which in a preferred embodiment of the invention is just past half of the sheet thickness, as measured from both sides of the sheet. The etched channels on one side are 106 offset from the etched channels 108 on other side so that when the sheet is etched from each side to a depth just past half the sheet thickness, the channels will meet with a predetermined width opening 110. This opening may be better controlled using an anisotropic etching technique. An exemplary pattern and the opening width is shown in FIGS. 2 and 3. The etched depth is controlled by the etchant flow, temperature, exposure time, etchant concentration, etc. This pattern is repeated in the X direction.

Figure 4:
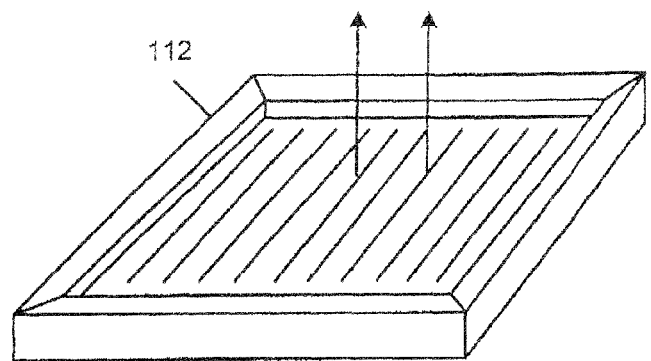
FIG. 4, 4A and 4B illustrate one embodiment of a filter made in accordance with my parent application.
Figure 4B:
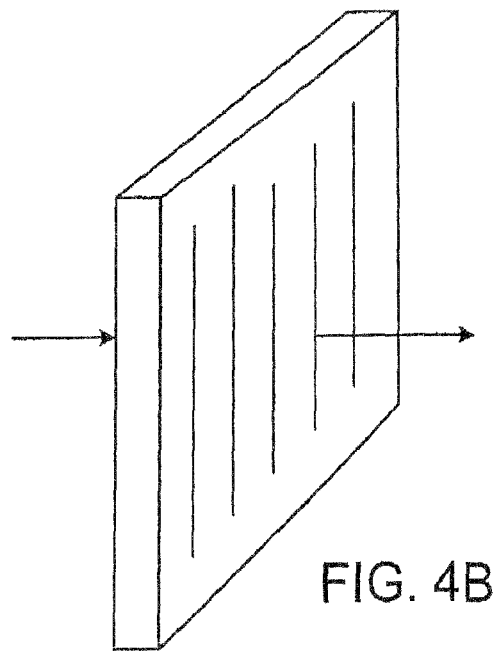
Figure 4A:
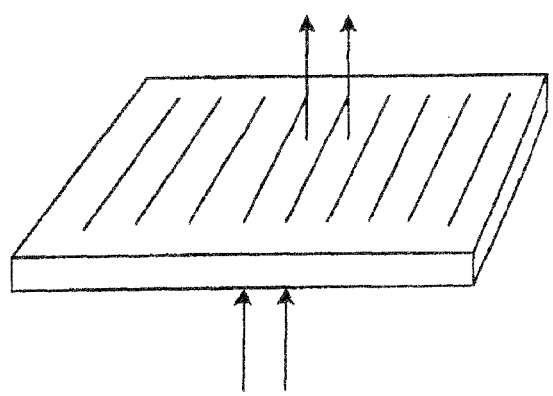
Figure 5:
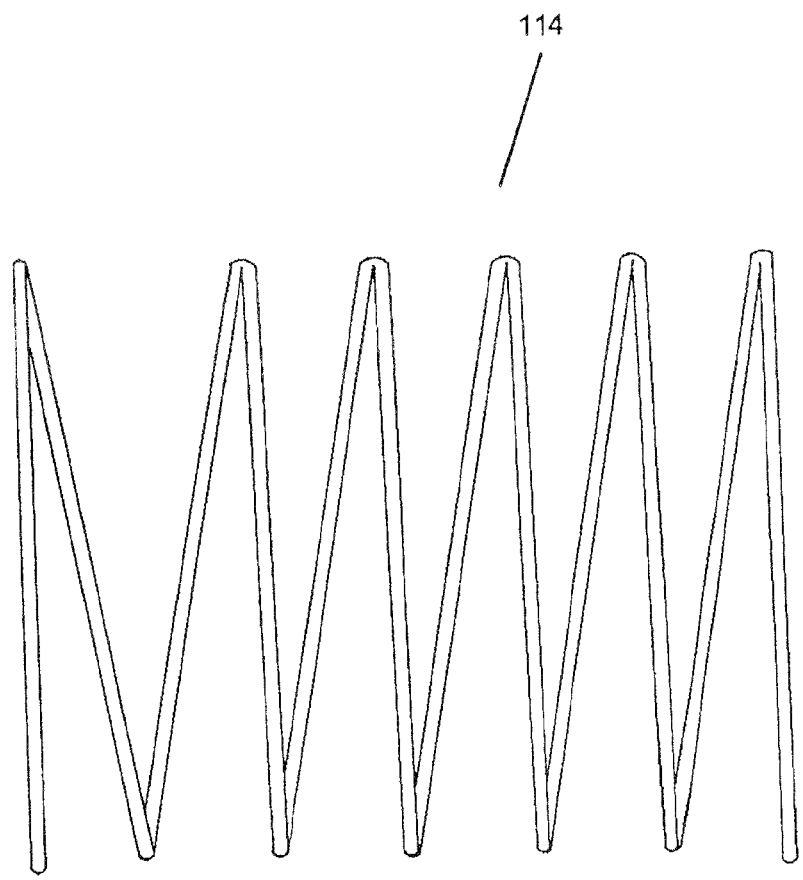
FIG. 5 illustrates how a filtration element made in accordance with the first embodiment of my parent application may be folded or pleated to increase the filtration area.

Once the basic filtration element in sheet form is obtained, further processing can be performed depending on the required application. For example, the etched sheet maybe cut into rectangular shape. With proper edge support 112 (see FIG. 4), it can be used as a filter as shown in FIGS. 4A and 4B, with fluid flows in the direction normal to the plate of this filter. Such an arrangement can be used as an air filter, or a household screen. This rectangular geometry can be folded or pleated, e.g. as shown at 114 in FIG. 5 to increase the filtration area.

The filtration element also can be used as an environmental separator that allows gas, including air, to flow through but inhibits the passing of liquid, such as water due to capillary effects.

The filtration element also can be used as a filter for a HVAC. For example, by placing the filter horizontally in a ceiling vent, heat will escape through the ceiling due to convective air flow, thus lowering the temperature of the living space. And yet it will prevent dust particles that are larger than the largest opening of the filter from recirculating into the living space.

Figure 6:
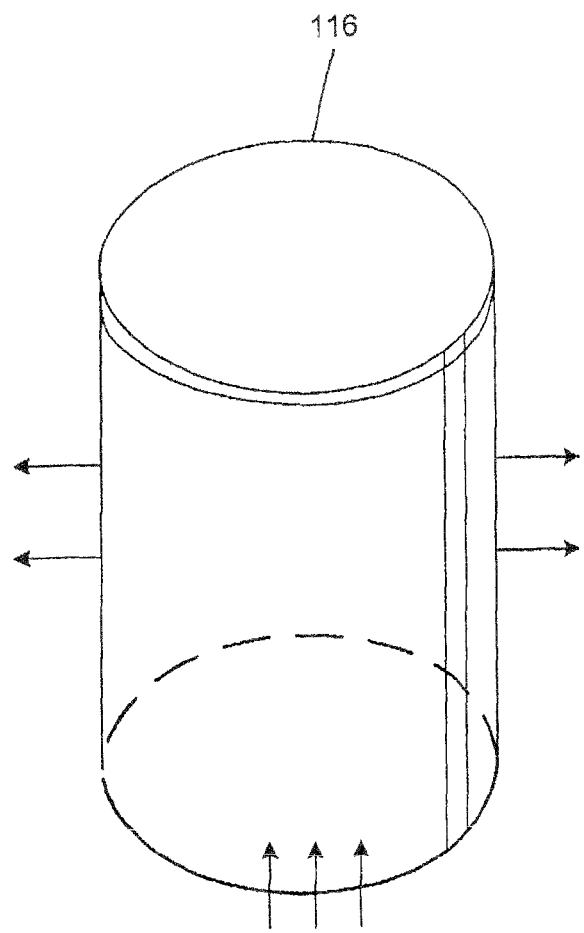
FIG. 6 shows how a filtration element made in accordance with my parent application may be wrapped to form a cylindrical filter element.

In another embodiment, shown in FIG. 6, the basic sheet can be cut into size, wrapped to form a cylinder, the two edges mated together, and one end of the cylinder capped at 116. The resulting structure can then be used as a cartridge filter. Fluid can flow from the open end through the etched channel openings and out radially as shown in FIG. 6. Particles larger in size than the maximum opening will be captured by the filtration element and retained inside the filter. Applications include, but not limited to, oil, gas and chemical filtering. Furthermore, this cylindrical shape can be folded to increase the filtration area and hence its efficiency and useful life.

Figure 7:
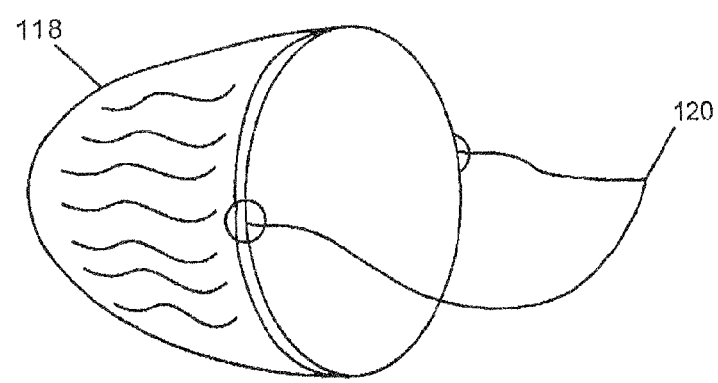
FIG. 7 shows how a basic filtering element of my parent application may be used to form a face mask.

In another embodiment, the etched sheet can be formed into a face mask 118 by shaping the etched sheet into a semispherical or similar shape, as shown in FIG. 7. The edge of this semispherical shape can be bonded with flexible material (such as rubber or plastic), and a stretchable strap 120 attached to two side edges. Such a device can be used as a breathing apparatus by stretching the strap over the face of human or animal. The flexible edge conforms to the fact of the human or animal and acts as a sealing boundary to prevent particles larger than the maximum opening of the filtration element getting to the breathed air stream.

With the use of photochemical etching technique to make a filtration element, several benefits are realized.

1. The processed and formed filters can be manufactured to a high precision with openings only limited by the capability of the etching system employed.

2. With the etching process, various materials are available depending on the application's requirements.

3. The filtration element can be cleaned depending on the application and become reusable, thus reducing environmental wastes and concerns.

While the above embodiment of the invention has been described in connection with certain preferred embodiments, various changes may be made in the invention without departing from the spirit and scope thereof. For example, while it is preferred to etch the filter element from both sides to a depth just past half of the thickness of the sheet, other relative depths are possible.

Figure 17:
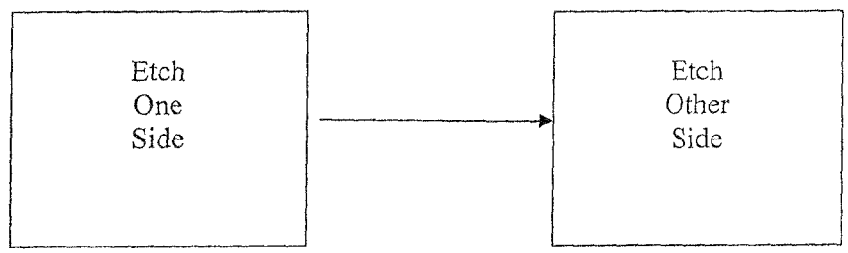
FIG. 17 is a block flow diagram illustrating a first alternative process for forming the filter element in accordance with the present invention.

And, while it is preferred to etch similar patterns on sides of the filter element, for certain applications such as in a ceiling vent, it may be preferred to etch different size channels on the two sides. For example, as illustrated in FIGS. 15-17, different size channels 150, 152 may be formed on opposite sides of a sheet 154, meeting at a common channel line 155. Providing different size channels on the two sides of the sheet permits one to obtain extremely fine channels for filtering purposes, while still achieving a stable sheet. Also, if desired, one or more fold lines 156, 158 may be provided in the sheet, e.g. by etching.

Alternatively, the channels and/or fold lines may be formed by rolling and slitting. However, etching is preferred and permits formation of finer and more consistent lines.

If desired, various filter elements having different size channels may be stacked to form a filter that separates particles by size. Also, by controlling etching, it is possible to control the shape of the channels, e.g. so that they taper.

Figure 8:
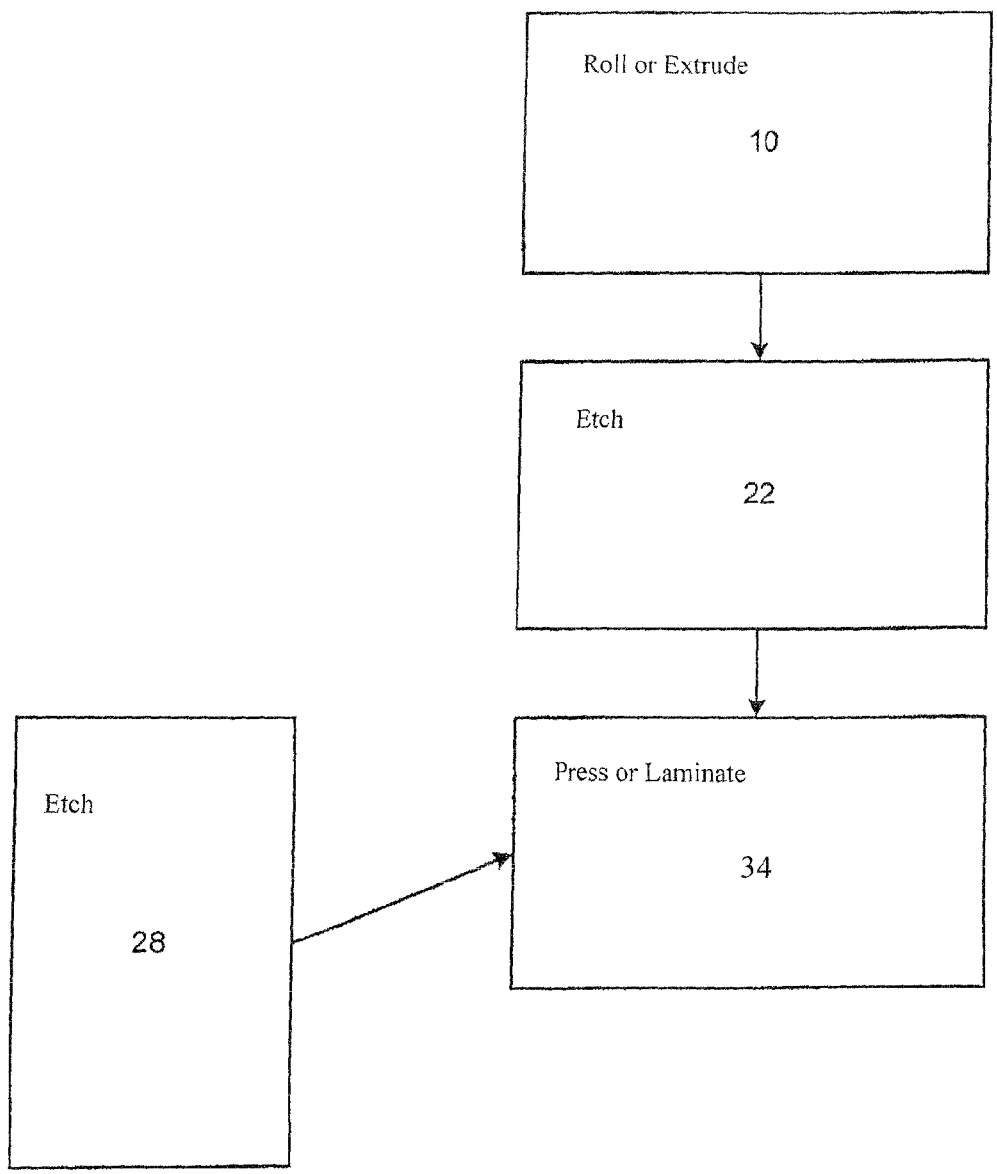
FIG. 8 is a block flow diagram illustrating the process of a second embodiment of my parent application.
Figure 9:
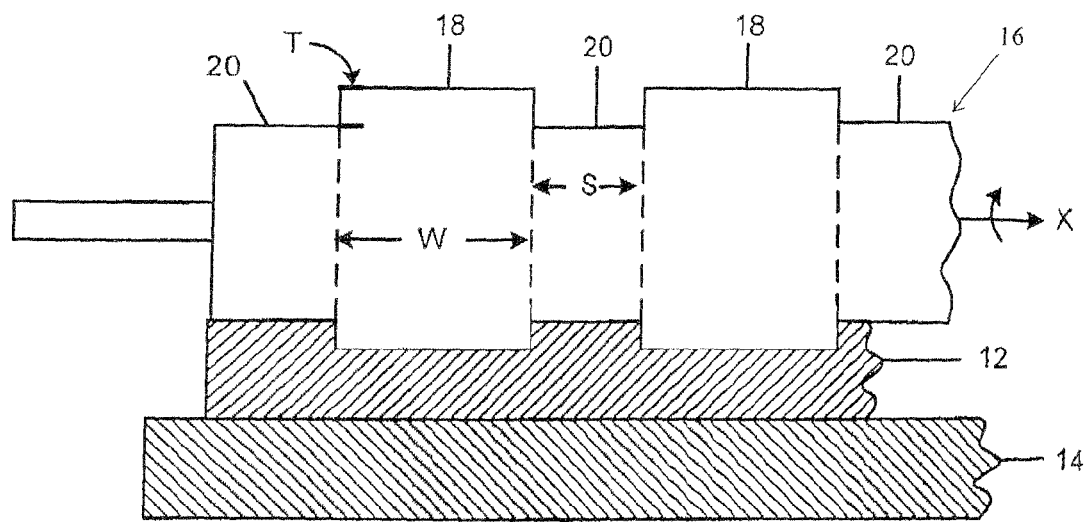
FIG. 9 is a side elevational view in cross section, illustrating the first step in the process of FIG. 8.

Referring to the FIGS. 8-9 another embodiment starts with a rolling or extrusion step 10 in which a first substrate, preferably a metal sheet 12 is extruded between a hard platen 14 and a roller 16. The sheets making up the filter element may comprise rigid or flexible materials. In a preferred embodiment, the filter material is formed from a rigid metal sheet, or a ceramic material.

Roller 16 has a plurality of lands 18 having a height or thickness T above valley areas 20. Lands 18 have a width W and are spaced from one another by a spacing S. Lands 18 may be formed by etching or machining away the surface of roller 16. Alternatively, lands 18 and valley areas 20 may be formed by an additive process using, for example, plasma spraying, chemical vapor deposition, and HVOF coating combined with a lithographic masking technique. Roller 16 should be formed of a hard heat resistant material such as ceramic, hardened steel or titanium so as to permit extrusion of metal sheet 12 under high pressure and elevated temperature.

Figure 10:
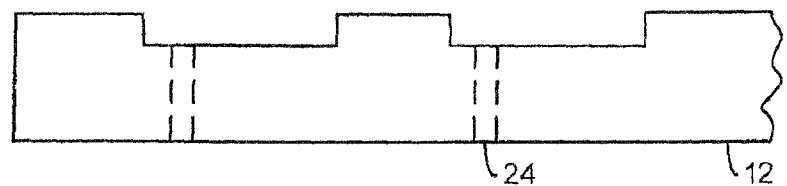
FIG. 10 is a side elevational view, in cross section, and FIG. 11 a top plan view, of an extruded sheet after etch through in a first etching step of the process of FIG. 8.
Figure 11:
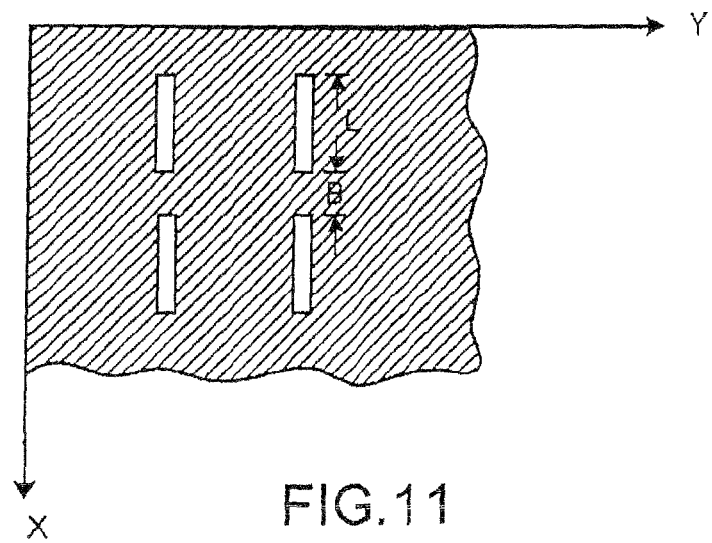

Referring to FIGS. 10 and 11, the extruded sheet is then subjected to an etching step 22 to form a plurality of vias 24 through the valley areas 20 having a length L and width B in a repeated pattern.

Figure 12:
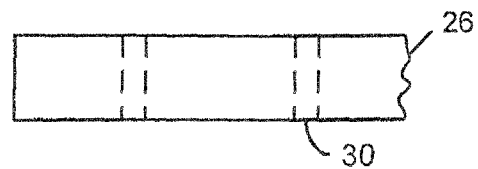
FIG. 12 is a side elevational view, in cross section, and FIG. 13 a top plan view, of a second sheet after etching in accordance with a second etching step of FIG. 8.
Figure 13:
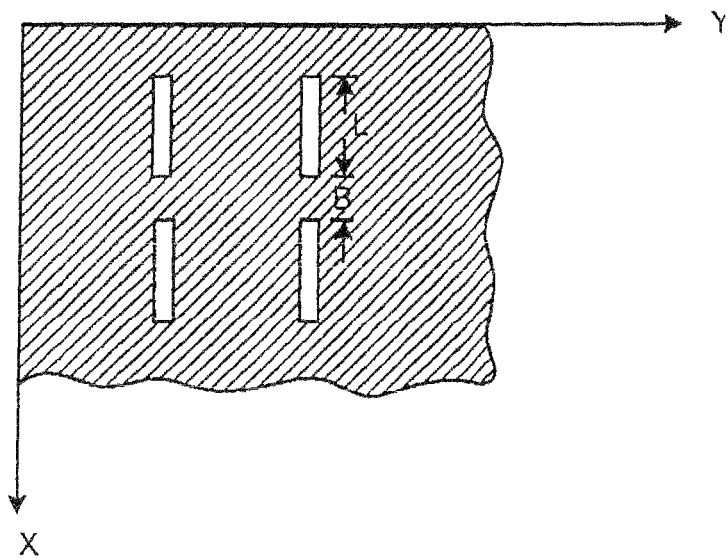
Figure 14:
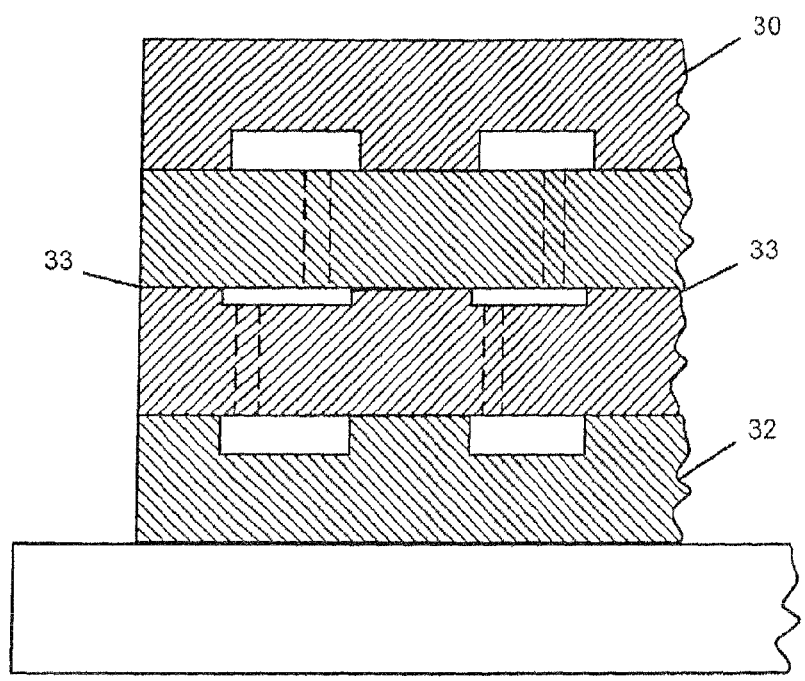
FIG. 14 is a side elevational view, in cross section, showing assembly of a plurality of sheets stacked to form a filter element in accordance with the second embodiment of my parent application.

Referring also to FIGS. 12 and 13, a second sheet 26 is subjected to a second etching step 28 to form a plurality of vias 30 preferably having similar length L and width B in a repeated pattern.

The contoured etched sheet 12 resulting from step 22 and the etched sheet 28 resulting from step 28 are then stacked between top and bottom loading plates 30, 32, respectively, and the sheets 12 and 26 are bonded to one another at bonding surfaces 33 in a pressing or laminated step 34.

The pressing or laminating step 34 will be dependent on several factors including:
  (a) The materials used
  (b) Applied temperature
  (c) Applied loading force and its uniformity
  (d) Preparation of material or materials to be bonded
  (e) Controlled environment
  (f) Duration of applied bonding conditions
  (g) Mating geometry
  (h) Thickness of material or materials What results is a filter element, having a filtration size essentially determined by the land height T.

Various changes may be made in the above invention without departing from the spirit and scope. For example, rather than extruding or rolling sheet 12 to form lands and valleys, the valleys may be formed by a two step etching process wherein a series of valleys are formed in a first masked etching step, and then vias are formed through the valley regions in a second masked etching step.

Yet other possibilities are to use an additive step for forming the lands, for example, by bonding a series of strips of metal of thickness T to the metal substrate 12. Also, rather than etching, one can form the flow paths mechanically, e.g. using a punch to punch flow paths through the valley areas or a blade to cut the flow paths, or by using a laser to cut the flow paths. The flow paths may be punched or formed simultaneously with the extrusion or rolling step, or in a separate step.

Figure 18:
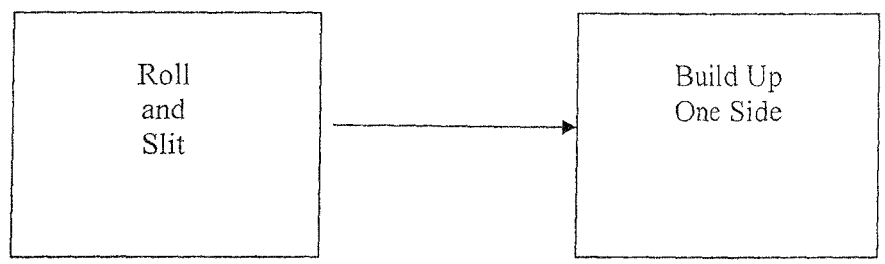
FIG. 18 is a block flow diagram illustrating a second alternative process for forming the third embodiment of filter element in accordance with the present invention.

In still yet another embodiment, illustrated in FIG. 18, the filter element also may be formed by an additive process such as by masking and plating strips of metal to one or both sides of a slotted substrate.

The filter element may comprise a rigid or flexible material. In a preferred embodiment, the filter material is formed from a rigid metal sheet. By making the filter of a rigid metal sheet, the filter can be washed and reused. However, the filter does not have to be reused. Forming the filter of metal also makes the filter useful, for example, in high temperature conditions such as in an engine exhaust or cooking exhaust. In such environments, the filter element, after etching, may be coated with a catalyst material, e.g. for treating the exhaust. Thus, the addition to a use as a filter for particulate material, the filters made in accordance with the present invention also may be used, for example, for automotive or other combustion applications.

As will be appreciated, the present invention provides manufacturing of filters to a high precision with openings only limited by the capability of the etching system employed. Also, forming the filtration elements of metal provides a filtration element that can be cleaned and reused.

Various other changes may be made without departing from the spirit and scope of the invention. For example, the invention has been described as etching the elements from one side, it is possible to etch from both sides. Also, various filter elements having different size vias may be stacked to form a filter that separates particles by size. Also, by controlling etching, it is possible to control the shape of the vias.

Yet other changes may be made without departing from the spirit and scope of the invention.

I claim:

1. A method of forming a filter material comprising the steps of:
   providing a sheet material;
   rolling the sheet material to form a contoured sheet material having a plurality of spaced land and valley areas formed on a first side of the sheet, wherein the land areas are evenly spaced from one another and are thicker than the valley areas; and
   forming on a second side of the sheet a plurality of vias running to the valleys, wherein the vias are narrower in width than the spacing between the land areas.

2. The method of claim 1, wherein the sheet material is formed of a metal or ceramic material.

3. The method of claim 1, wherein the vias are formed mechanically or by using a laser.

4. The method of claim 1, wherein the vias are formed by etching, machining or laser drilling.

5. The method of claim 4, including the step of masking the sheet prior to etching.

6. The method of claim 1, including the step of forming fold lines in the sheet material.

7. A method of forming a filter material comprising the steps of:
   extruding a material to form a contoured sheet material having a plurality of spaced land and valley areas formed on a first side of the sheet, wherein the land areas are evenly spaced from one another and are thicker than the valley areas; and
   forming on a second side of the sheet a plurality of vias running to the valleys, wherein the vias are narrower in width than the spacing between the land areas.

8. The method of claim 7, wherein the material comprises a metal or ceramic material.

9. The method of claim 7, wherein the vias are formed mechanically or by using a laser.

10. The method of claim 7, wherein the vias are formed by etching, machining or laser drilling.

11. The method of claim 10, including the step of masking the sheet prior to etching.

12. The method of claim 7, including the step of forming fold lines in the sheet material.

\* \* \* \* \*